(12) United States Patent
Williams, Jr. et al.

(10) Patent No.: US 7,627,573 B2
(45) Date of Patent: Dec. 1, 2009

(54) BYPASSING NATIVE STORAGE OPERATIONS BY COMMUNICATING PROTECTED DATA WITHIN LOCKING MESSAGES USING A LOCK MANAGER INDEPENDENT OF THE STORAGE MECHANISM

(75) Inventors: John J. Williams, Jr., Pleasanton, CA (US); John Andrew Fingerhut, Campbell, CA (US); Jonathan Rosen, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 824 days.

(21) Appl. No.: 10/811,044

(22) Filed: Mar. 27, 2004

(65) Prior Publication Data
US 2005/0216461 A1 Sep. 29, 2005

(51) Int. Cl.
*G06F 7/00* (2006.01)
*G06F 17/30* (2006.01)

(52) U.S. Cl. .................................. 707/8; 707/9; 707/10
(58) Field of Classification Search ............... 707/8–10, 707/1
See application file for complete search history.

(56) References Cited

U.S. PATENT DOCUMENTS

| | | | |
|---|---|---|---|
| 5,151,988 A * | 9/1992 | Yamagishi | 707/8 |
| 5,327,556 A * | 7/1994 | Mohan et al. | 707/8 |
| 5,551,046 A * | 8/1996 | Mohan et al. | 707/8 |
| 5,845,147 A | 12/1998 | Vishlitzky et al. | |
| 6,253,273 B1 | 6/2001 | Blumenau | |
| 6,553,464 B1 | 4/2003 | Kamvysselis et al. | |
| 7,120,631 B1 * | 10/2006 | Vahalia et al. | 707/8 |
| 2002/0184216 A1 * | 12/2002 | Chandrasekaran et al. | 707/8 |

OTHER PUBLICATIONS

Yun et al. "An Efficient Locking Protocol for Home Based Lazy Release Consistency", Proceedings of the First IEEE/ACM International Symposium on Cluster Computing and The Grid, pp. 527-532; May 2001.*

Amiri et al. ("Highly Concurrent Shared Storage", Proceedings of the International Conference On Distributed Computing Systems, Taipei, Apr. 2000.*

Trancoso et al., "The Impact of Speeding up Critical Sections with Data Prefetching and Forwarding", 1996 International Conference on Parallel Processing, pp. III-79-III-86, 1996 IEEE.*

Coulouris et al., Distributed Systems Concepts and Design, Third Edition, Addison-Wesley, Ch. 12, pp. 465-514, 2001.

* cited by examiner

*Primary Examiner*—Neveen Abel Jalil
*Assistant Examiner*—Michael J Hicks
(74) *Attorney, Agent, or Firm*—The Law Office of Kirk D. Williams

(57) ABSTRACT

Data is protected using locks, with the protected data sometimes being included in the locking messages, which may reduce overall processing latency, and/or reduce a bandwidth requirement for and/or number of storage operations accessing the native storage of the protected data. For example, the lock manager receives lock requests from each of the requesters, and selectively grants the lock requests. The protected data is typically communicated in the locking messages when the lock is highly contested, or at least two request for access to the data are pending. The lock manager initiates the sequence by indicating in a grant message to a requester to include the protected data in its release message. The lock manager then copies this data received in the release message to its grant message to the next requestor. If no other requesters are waiting, the grant message includes an indication not to send the protected data, and thus the requestor typically stores this protected data to storage so it can be accessed in the future.

26 Claims, 7 Drawing Sheets

LOCK MESSAGES

**LOCK MANAGER:
LOCK REQUEST RECEIVED

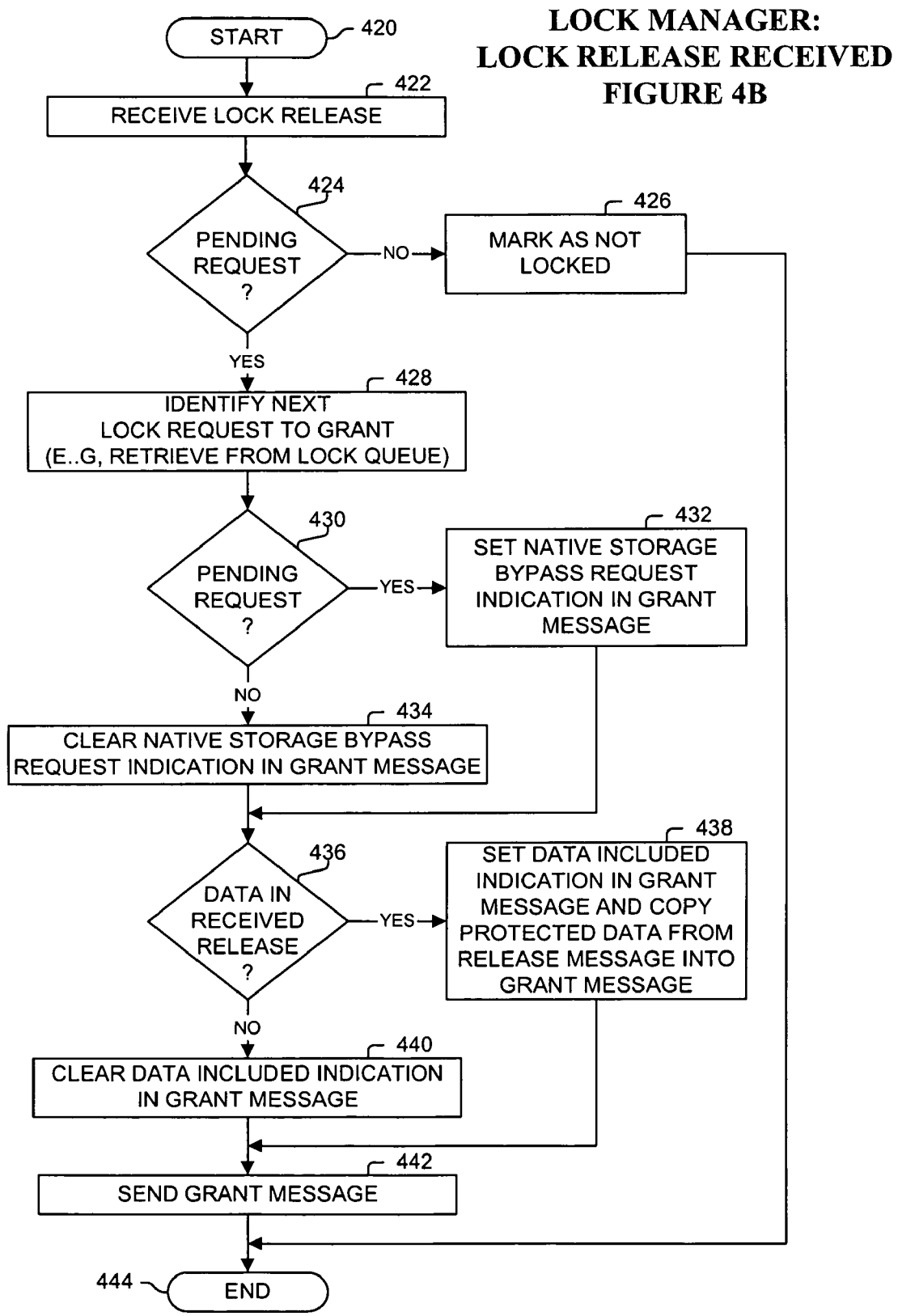

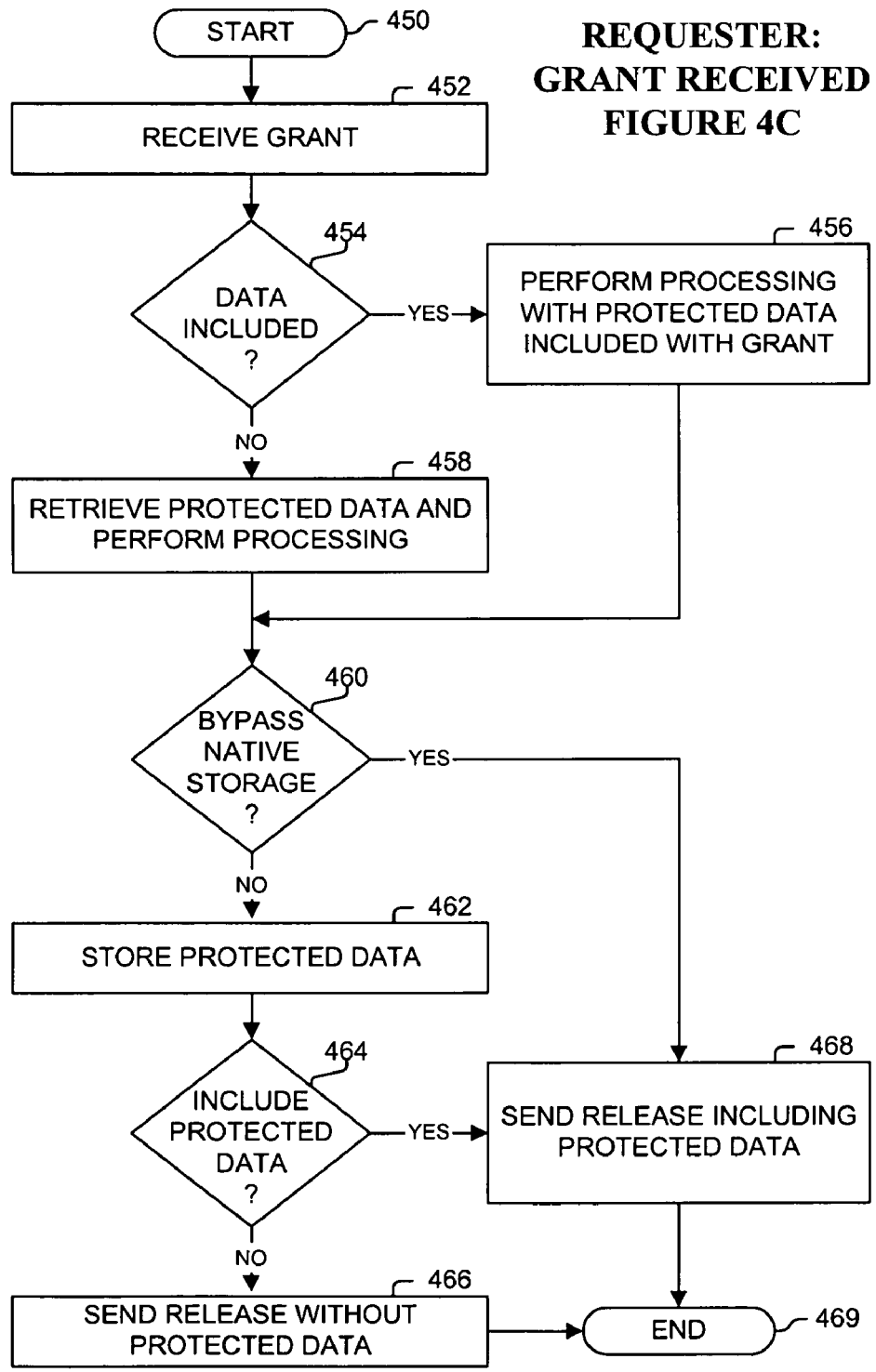

BYPASSING NATIVE STORAGE OPERATIONS BY COMMUNICATING PROTECTED DATA WITHIN LOCKING MESSAGES USING A LOCK MANAGER INDEPENDENT OF THE STORAGE MECHANISM

TECHNICAL FIELD

One embodiment of the invention relates to communications and computer systems employing locking mechanisms to protect data; particularly, one embodiment relates to communicating protected data within locking messages; and more particularly, one embodiment relates to bypassing native storage by communicating protected data within locking messages with a lock manager independent of the storage mechanism.

BACKGROUND

In many multiprocessor environments, inter-processor communication is provided through shared global memory. Access to this memory is generally protected through locks. The latency for access to these resources is coupled through the critical section of code and includes acquiring the lock, reading the data, writing the data, and finally releasing the lock. Note, nothing described or referenced in this document is admitted as prior art to this application unless explicitly so stated.

One such prior approach is illustrated in FIG. 1, which shows how three requesters request and gain access to protected data. Note, as shown in FIG. 1, the lock manager is independent of the storage mechanism as it does not access the lock protected data from its native storage. In fact, the lock manager of FIG. 1 never communicates nor otherwise processes a value of the protected data.

As shown, each requester sends a request to the lock manager, which provides independent access to the protected data by sending a grant message to one of the requesters. The granted requester then reads the protected data, performs its processing, writes the protected data back to memory, and then sends a release request to the lock manager to indicate that it is done with the protected data. This process repeats and a next requester is granted access to the data. Thus, there can be significant amount of latency that is exposed in the critical section of code, especially when multiple processors are queued up behind a single locking queue. The significant amount of latency is also true of processors that rely on caching within the processor units to provide temporary storage as well as provide direct inter-processor communication to transfer data.

Also, one known system includes a lock manager in an I/O subsystem which allows a message to include both locking and data storage requests. This allows a requester proxy process in the I/O subsystem to receive a message with both a lock request and an I/O request. In response, this proxy process makes a request to the lock manager for the lock, and in response to a grant, it then makes the corresponding I/O request corresponding to the I/O request and its native storage. This approach may reduce some messages and latency when the protected data is located in another subsystem, but in response to each grant, the I/O native storage is still accessed.

SUMMARY

Disclosed are, inter alia, methods, apparatus, data structures, computer-readable media, mechanisms, and means for communicating protected data within locking messages. Data is protected using locks, with the protected data sometimes being included in the locking messages, which may reduce overall processing latency, and/or reduce a bandwidth requirement for and/or number of storage operations accessing the native storage of the protected data. For example, in one embodiment, the lock manager receives lock requests from each of the requesters, and selectively grants the lock requests. The protected data is typically communicated in the locking messages when the lock is highly contested, or at least two request for access to the data are pending. The lock manager initiates the sequence by indicating in a grant message to a requester to include the protected data in its release message. The lock manager then copies this data received in the release message to its grant message to the next requestor. Although this operation may require the lock manager to temporarily store the received release message including the protected data, it does not cache or otherwise store the protected data locally awaiting the receipt of a next request, for example. If no other requesters are waiting, the grant message includes an indication not to send the protected data, and thus the requester typically stores this protected data to storage so it can be accessed in the future.

One embodiment includes a lock manager configured to control access via a lock to protected data maintained in native storage independent of the lock manager. The lock manager does not access the protected data from the native storage, rather it copies the protected data received into grant messages sent to a next requester. The lock manager is configured to receive lock requests for the lock from multiple requesters, and to selectively grant the lock requests which includes communicating grants from the lock manager to the plurality of requesters, wherein at least one of the communicated grants includes the protected data.

In one embodiment, wherein at least one of the communicated grants does not include the protected data. In one embodiment, each of the communicated grants includes an indication of whether or not the protected data is being communicated therewith. In one embodiment, each of the communicated grants includes an indication of whether or not the protected data is requested to be sent to the lock manager with a corresponding release of the lock. In one embodiment, each of the lock requests includes an indication of whether or not the corresponding one of the plurality of requesters will accept the protected data from the lock manager.

One embodiment includes a lock manager that controls access to protected data maintained in native storage independent of the lock manager, wherein the lock manager does not access the protected data from the native storage. The lock manager receives a release of a lock for use in controlling access to the protected data, with the received release including the protected data. A next requester to be granted the lock is identified in response to the receiving the release of the lock. The protected data is copied from the release into a grant message, and the grant message including the protected data is sent to the next requester. In one embodiment, the grant message includes an indication of that the protected data is requested to be sent to the lock manager in a release message corresponding to the grant message if another requester is waiting for the lock, else an indication that the protected data is not requested to be sent to the lock manager in the release message.

One embodiment includes a lock manager that controls access to protected data maintained in native storage independent of the lock manager, wherein the lock manager does not access the protected data from the native storage. The lock manager receives locking requests for a lock controlling access to the protected data from a first requester and a second requester. The lock manager sends a first grant message not including the protected data to the first requester, and in response to identifying one or more requesters is waiting for the lock after the first requester, an indication to return the protected data is included in the grant message. A first release message including the protected data for the lock is subsequently received from the first requester.

In one embodiment, a second grant message is sent to the second requester, with the second grant message including the protected data and an indication of whether or not to send the protected data in a second release message. In one embodiment, the second grant message includes an indication to send the protected data in the second release message in response to identifying another requestor is waiting for access to the lock. In one embodiment, the second grant message includes an indication not to send the protected data in the second release message in response to identifying another requestor is not waiting for access to the lock. In one embodiment, the second grant message includes an indication not to send the protected data in the second release message, and in response to the indication not to send the protected data in the second release message, the second requester stores the protected data and does not include the protected data in the second release message.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 4A-B illustrate lock manager processes used in one embodiment;

FIG. 4C illustrates a requester process used in one embodiment; and

DETAILED DESCRIPTION

Figure 1:
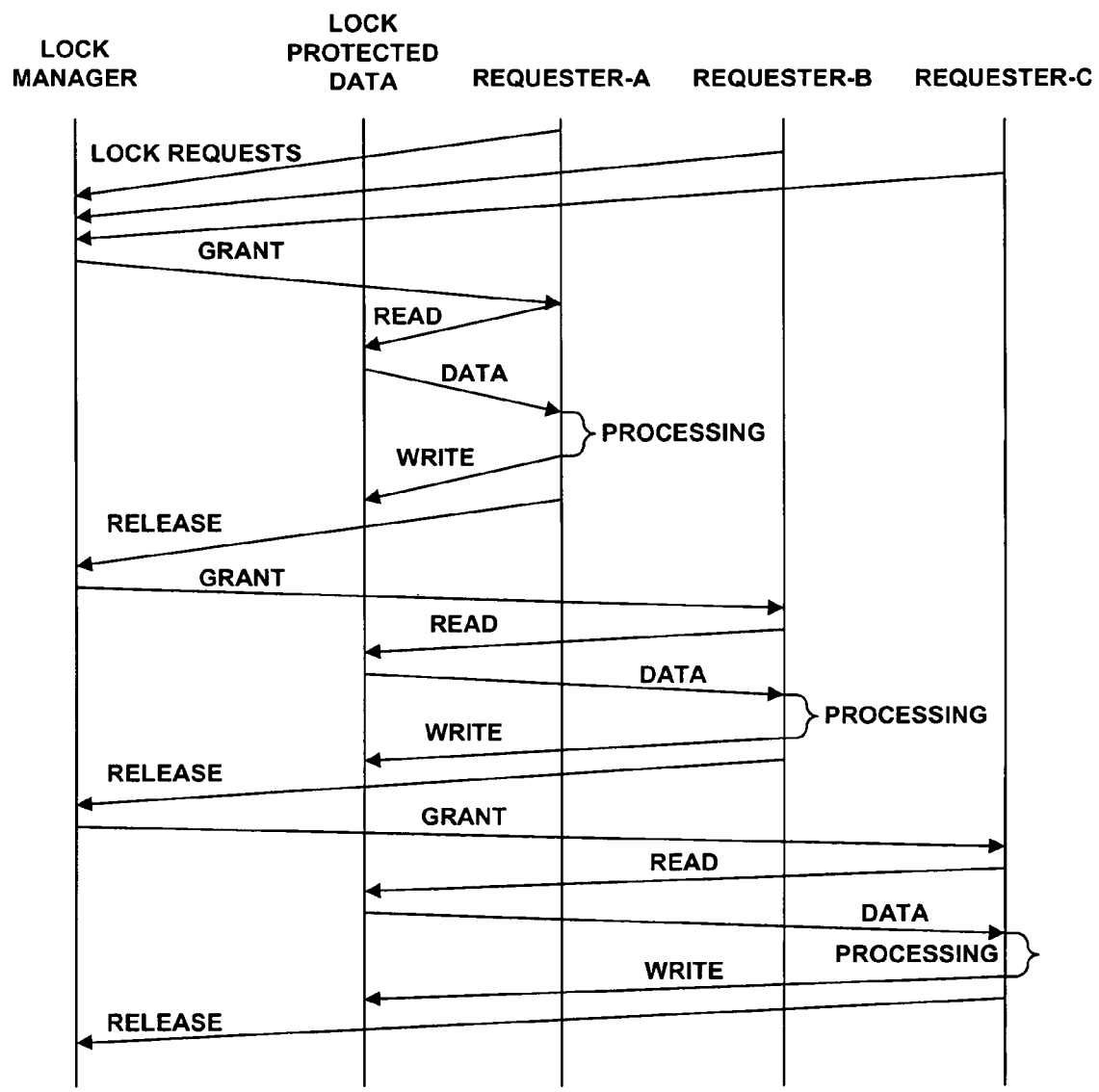
FIG. 1 illustrates a prior approach for using a lock to protect access to data.

Disclosed are, inter alia, methods, apparatus, data structures, computer-readable media, mechanisms, and means for communicating protected data within locking messages.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Locks can be used for many purposes. For example, one application of locks is described in Williams et al., "Using Ordered Locking Mechanisms to Maintain Sequences of Items Such as Packets," U.S. patent application Ser. No. 10/706,704, filed Nov. 12, 2003, which is hereby incorporated by reference.

Disclosed are, inter alia, methods, apparatus, data structures, computer-readable media, mechanisms, and means for communicating protected data within locking messages. Data is protected using locks, with the protected data sometimes being included in the locking messages, which may reduce overall processing latency, and/or reduce a bandwidth requirement for and/or number of storage operations accessing the native storage of the protected data. For example, in one embodiment, the lock manager receives lock requests from each of the requesters, and selectively grants the lock requests. The protected data is typically communicated in the locking messages when the lock is highly contested, or at least two request for access to the data are pending. The lock manager initiates the sequence by indicating in a grant message to a requester to include the protected data in its release message. The lock manager then copies this data received in the release message to its grant message to the next requestor. Although this operation may require the lock manager to temporarily store the received release message including the protected data, it does not cache or otherwise store the protected data locally awaiting the receipt of a next request, for example. If no other requesters are waiting, the grant message includes an indication not to send the protected data, and thus the requestor typically stores this protected data to storage so it can be accessed in the future.

One embodiment includes a lock manager configured to control access via a lock to protected data maintained in native storage independent of the lock manager. The lock manager does not access the protected data from the native storage, rather it copies the protected data received into grant messages sent to a next requester. The lock manager is configured to receive lock requests for the lock from multiple requesters, and to selectively grant the lock requests which includes communicating grants from the lock manager to the plurality of requesters, with at least one of the communicated grants includes the protected data.

In one embodiment, at least one of the communicated grants does not include the protected data. In one embodiment, each of the communicated grants includes an indication of whether or not the protected data is being communicated therewith. In one embodiment, each of the communicated grants includes an indication of whether or not the protected data is requested to be sent to the lock manager with a corresponding release of the lock. In one embodiment, each of the lock requests includes an indication of whether or not the corresponding one of the plurality of requesters will accept the protected data from the lock manager.

One embodiment includes a lock manager that controls access to protected data maintained in native storage independent of the lock manager. The lock manager does not access the protected data from the native storage. The lock manager receives a release of a lock for use in controlling access to the protected data, with the received release including the protected data. A next requester to be granted the lock is identified in response to the receiving the release of the lock. The protected data is copied from the release into a grant message, and the grant message including the protected data is sent to the next requester. In one embodiment, the grant message includes an indication of that the protected data is requested to be sent to the lock manager in a release message corresponding to the grant message if another requester is waiting for the lock, else an indication that the protected data is not requested to be sent to the lock manager in the release message.

One embodiment includes a lock manager that controls access to protected data maintained in native storage independent of the lock manager. The lock manager does not access the protected data from the native storage. The lock manager receives locking requests for a lock controlling access to the protected data from a first requester and a second requester. The lock manager sends a first grant message not including the protected data to the first requester, and in response to identifying one or more requesters is waiting for the lock after the first requester, an indication to return the protected data is included in the grant message. A first release message including the protected data for the lock is subsequently received from the first requester.

In one embodiment, a second grant message is sent to the second requester, with the second grant message including the protected data and an indication of whether or not to send the protected data in a second release message. In one embodiment, the second grant message includes an indication to send the protected data in the second release message in response to identifying another requester is waiting for access to the lock. In one embodiment, the second grant message includes an indication not to send the protected data in the second release message in response to identifying another requestor is not waiting for access to the lock. In one embodiment, the second grant message includes an indication not to send the protected data in the second release message, and in response to the indication not to send the protected data in the second release message, the second requester stores the protected data and does not include the protected data in the second release message.

One embodiment provides an indirect interprocess communication bypass channel through a lock mechanism that is connected to many processors. These processors normally communicate through shared global memory and use locks to enforce coherency. Under certain conditions, data can be transferred through lock messages instead of going through shared global memory. The data can be piggy-backed to the lock release message, go through the lock mechanism, and be piggy-backed to the lock grant message. The data is not stored for any significant amount of time in the lock mechanism. The lock messages typically include control signals to indicate when the conditions are right to use the bypass channel. This enforces the coherency of the shared memory location that might be bypassed.

When claiming to piggy-back the data to the lock message, the bypass channel could be either serial or parallel to the lock message channel, as long as there is a strong binding of lock messages to bypass data. In one embodiment, when requesting a lock, the request message includes an indication if it is willing to accept data through the bypass channel. When the lock is finally granted, the grant message indicates if it has data in the bypass channel, and if there is an entry following it in the locking queue that is willing to accept data through the bypass channel. If the grant indicates that data is present in the bypass channel, then the critical section can skip the read of the global shared memory location and use the data from the bypass channel instead.

If the grant indicates that the next entry in the locking queue is willing to accept data from the bypass channel, then the critical section of code can skip the write of the global shared memory location and send the data through the bypass channel instead. The critical section of code can always send the data through the bypass channel with the hope that a new arrival in the locking queue can use the data, but it must first commit the write to global shared memory if it is not certain. When the lock is released, an indication is made in the release message whether the bypass channel has data in it or not. The data in the bypass channel is typically not stored in memory in the lock mechanism; rather it is simply copied (possibly using a temporary storage location or register) from the release message and attached to the subsequent grant message.

Figure 2:
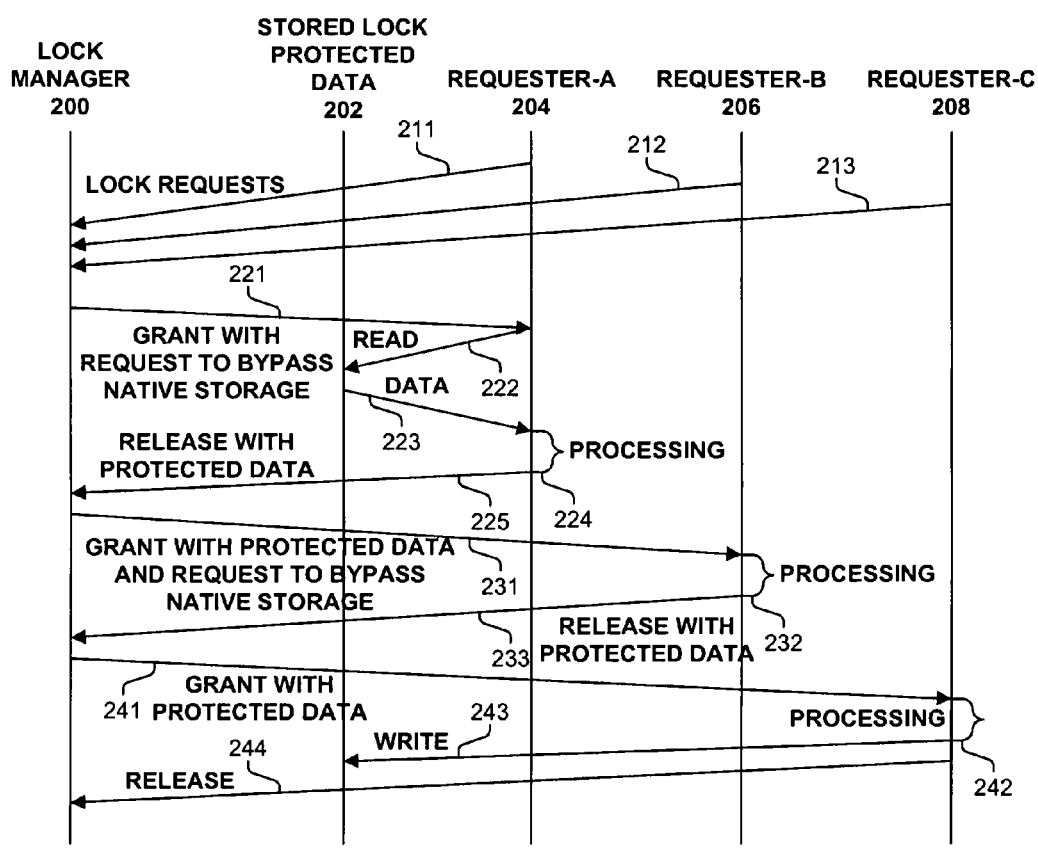
FIG. 2. illustrates an approach used in one embodiment for protecting access to data with the protected data being communicated in conjunction with locking messages.

Turning to the figures, FIG. 2. illustrates an approach used in one embodiment for protecting access to data with the protected data being communicated in conjunction with locking messages. Lock manager 200 receives locking requests 211-213 from requester-A 204, requester-B 206, and requester-C 208. Note, lock manager 200 is independent of the storage mechanism/protected data 202 as it does not access stored lock protected data 202 from its native storage as depicted in FIG. 2.

Figure 3:
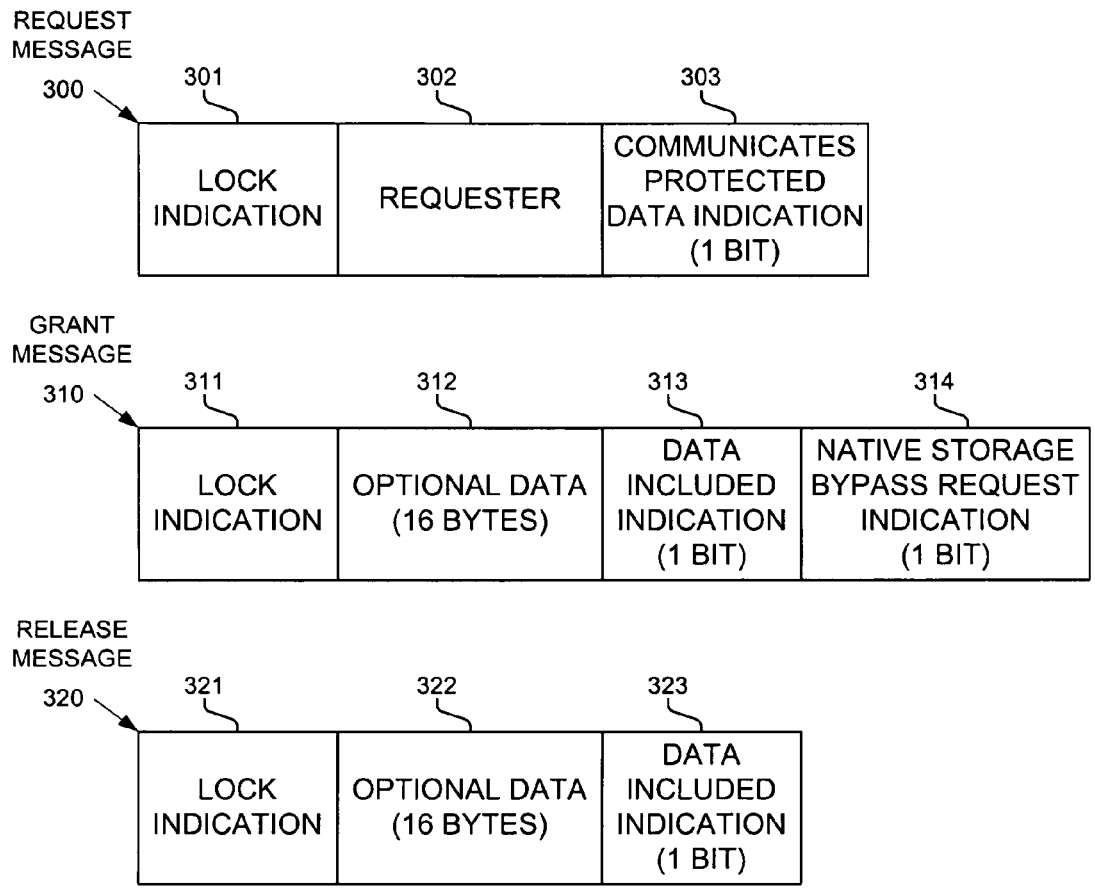
FIG. 3 illustrates locking messages used in one embodiment.

An example of such a locking request is locking request message 300 illustrated in FIG. 3. As shown, request message 300 includes an indication 301 of which lock is being requested, an identification 302 of the requester, and an indication 303 of whether the requester supports protected data in locking messages. Of course, one embodiment uses another communication mechanism and/or some, all, or none of values 301-303. Also, the number of bits illustrated for certain fields are only exemplary of one embodiment.

For purposes of illustration, the description of FIG. 2 will assume that all requesters will always support protected data in locking messages (and thus indication 303 is not required). In one embodiment when all requesters do not always support protected data being communicated in locking messages, locking manager 200 will only request protected data when the next requester supports such, and provide protected data in a locking message to a supporting requester.

Also shown in FIG. 3, is a grant message 310 used in one embodiment, and release message 320 used in one embodiment. As shown, grant message 310 includes a lock indication 311 identifying the lock, a field 312 for including protected data, an indication 313 of whether or not field 312 is populated with the protected data, and an indication 314 of whether or not an explicit request to bypass native storage for the protected data is being made.

In one embodiment, if the native storage bypass request indication is set, the requester must return the latest value of the protected data in a corresponding release message, and the requester may or may not store the protected data in its native storage prior to sending the release (i.e., the value of the protected data in the native storage may or may not be the latest value). If the native storage bypass request indication is not set, the requester must store the latest value of protected value in its native storage prior to sending the release, and the release may or may not include a value of the protected value and if it does include such a value, it is the latest value of the protected data. It is important in this situation that the value be stored in the native storage, as the lock manager will not cache, write to native storage, or otherwise maintain a value of the protected data awaiting a next requester. If a requester is not waiting at time of receipt of a release message containing the protected data, the lock manager drops the protected data, and thus a next requester will need to retrieve it from native storage.

Optionally or always sending the protected data in the release message may be particularly useful when bandwidth to the lock manager is not an issue or a bit field for the protected data is always allocated and sent so it might as well be populated with the protected data. Thus, if the lock manager receives a release message including the protected data, it knows it can send the protected data to the next requester as it includes the latest value of the protected value. This may be particularly useful if no other requester at time of grant is waiting for the lock (and thus a request to return the protected data is typically not included in the grant message), and a requester is waiting for the lock when the release message optionally including the protected data is received. In which case, the waiting requester can receive the protected data and not have to retrieve it from the native storage location of the protected data.

Also shown in FIG. 3 is release message 320, which includes a lock indication 321 identifying the lock, a field 322 for including protected data, an indication 323 of whether or not field 322 is populated with the protected data. Of course, many different messages, fields within a message, and semantics of such messages and fields may be used by an embodiment in keeping with the scope and spirit of the invention.

Returning to the processing illustrated in FIG. 2, lock manager 200 selects one of the received locking requests, typically in the order received and queues the other requests pending the receipt of a locking release. For purposes of this illustration, lock manager 200 will service locking requests 211, 212 and 213 in that order.

Locking manager 200, in response to locking request 211, prepares and sends (221) a grant to requester-A 204. Locking manager 200, in response to one or more pending other requests for the lock, includes an indication in the grant for the protected data to be included in a corresponding release message (e.g., an active request to bypass native storage). Requester-A 204, in response to the grant, reads (222) and receives (223) lock protected data 202 typically from shared memory typically available to all requesters 204-208, and processes (224) data 202. Upon completion of processing the protected data, requester-A 204 communicates (225) a release of the lock with the latest value of the protected data to lock manager 200 in response to the request to include the protected data in the release message.

In response to receipt of the lock release and the protected data, lock manager 200 prepares a grant including the received protected data copied from the received release, and sends (231) the grant to requester-B 206. Locking manager 200, in response to one or more pending other requests for the lock, also includes an indication in the grant for the protected data to be included in a corresponding release message. Requester-B 206, in response to the grant, processes (232) based on the protected data received in the grant message. Note, it does not need to read stored lock protected data 202 as its latest value was included in the grant. Also, note, that at least in one embodiment, the current value of the protected data may be different from that of stored lock protected data 202. Upon completion of processing the protected data, requester-B 206 communicates (233) a release of the lock with the latest value of the protected data to lock manager 200 in response to the request to include the protected data in the release message.

In response to receipt of the lock release and the protected data, lock manager 200 prepares a grant including the received protected data copied from the received release, and sends (241) the grant to requester-C 208. Locking manager 200, in response to no pending requests for the lock, also includes an indication (e.g., a non-active request to bypass native storage) in the grant for that the protected data that the protective data must be written to its native storage (e.g., and the protected data may or may not be included in the corresponding release message). Requester-C 208, in response to the grant, processes (242) based on the protected data received in the grant message. Note, it does not need to read stored lock protected data 202 as its latest value was included in the grant. Upon completion of processing the protected data, requester-C 208 writes (243) the current value of the protected data to stored lock protected data 202, and communicates (244) a release of the lock possibly without the latest value of the protected data to lock manager 200 in response to the request to not include the protected data in the release message.

Figure 4A:
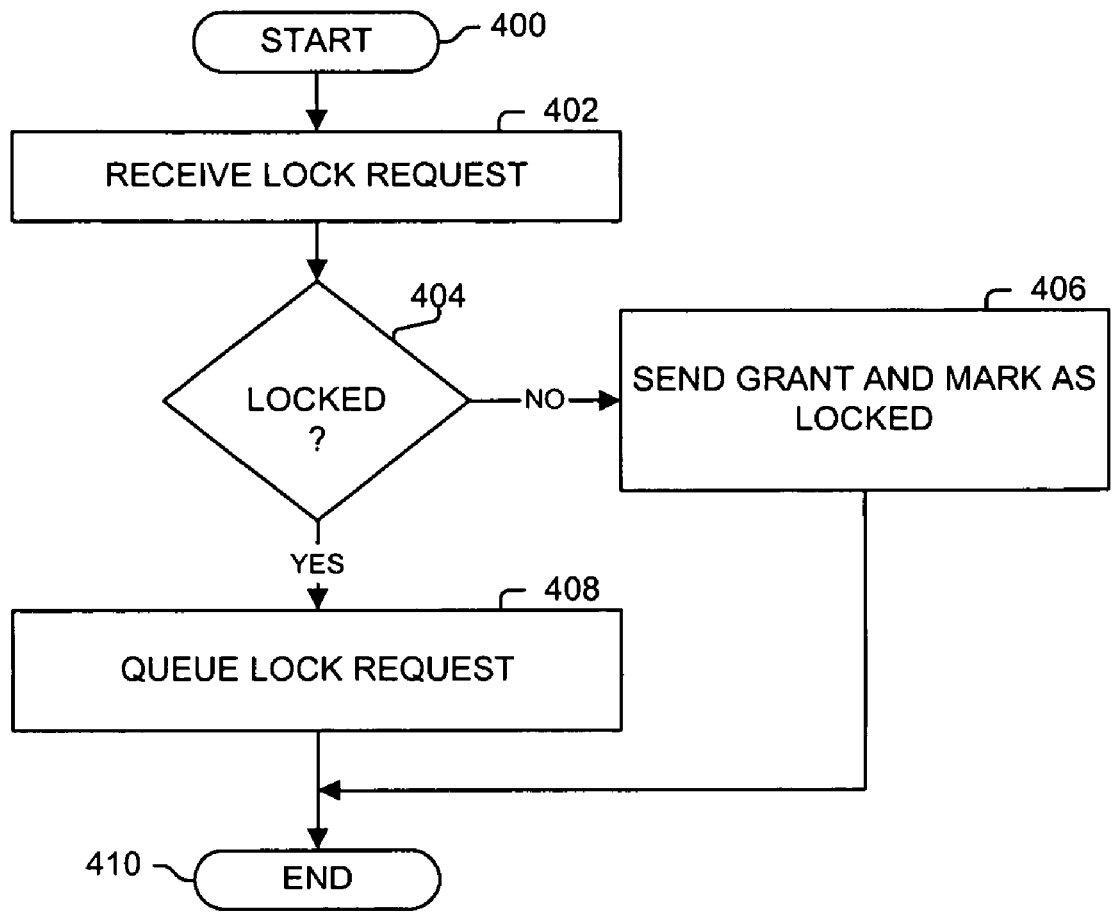

FIGS. 4A-B illustrate lock manager processes used in one embodiment. Turning first to FIG. 4A, processing begins with process block 400, and proceeds to process block 402, wherein a lock request is received. As determined in process block 404, if the lock is in the lock state, then in process block 408, the lock request is queued. Otherwise, in process block 406, a grant is communicated to the requester and the lock is marked as in the lock state. Processing is complete as indicated by process block 410.

Processing of the flow diagram of FIG. 4B begins with process block 420, and proceeds to process block 422, wherein a lock release is received. As determined in process block 424, if there is no pending request, then in process block 426, the lock is marked as in the not locked state; and processing is complete as indicated by process block 444.

Otherwise, in process block 428, a next lock request to grant is identified, typically from the head of the lock queue or based on some other methodology. As determined in process block 430, if there is another pending request, then in process block 432, the indication to send the protected data in the corresponding release message (i.e., the bypass native storage request indication) is set; otherwise, it is cleared in process block 434.

As determined in process block 436, if the protected data was received in the received lock release, then in process block 438, the protected data is copied from the received release message to the grant message, and an indication that the protected data is being included in the grant message is set. Otherwise, in process block 440, an indication is typically included in the grant message that the protected data is not being communicated. In process block 442, the grant message is sent to the identified next lock requester; and processing is complete as indicated by process block 444.

FIG. 4C illustrates a requester process used in one embodiment. Processing begins with process block 450, and proceeds to process block 452, wherein the grant is received. As determined in process block 454, if the protected data is included, then in process block 456, processing is performed based on the received protected data. Otherwise, in process block 458, the protected data is retrieved from storage, and processing is performed based on the retrieved protected data.

After processing of the protected data is complete, then, as determined in process block 460, if the received grant indicated that native storage is to be bypassed, then processing proceeds to process block 468. Otherwise, in process block 462, the latest value of the protected data is stored in its native storage location. As determined in process block 464, if the protected data is to be included in the release (e.g., it is always included, or optionally included based on some determination), then processing proceeds to process block 468. Otherwise, in process block 466, the release message is sent to the lock manager without the protected data. In process block 468, a release message including the latest value of the protected data is sent to the lock manager. Processing is complete as indicated by process block 469.

Figure 5A:
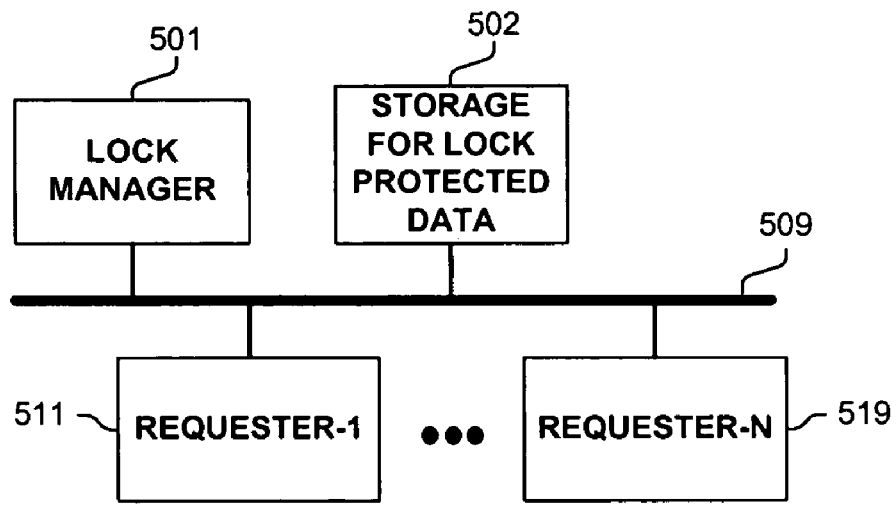
FIG. 5A illustrates a system including a lock manager and multiple requesters of one embodiment.

FIG. 5A illustrates a system including a lock manager 501 and multiple requesters 511-519 of one embodiment. FIG. 5A shows the extensible nature of one embodiment of the invention which can be applied to an application. Lock manager 501 and multiple requesters 511-519 can be processes, separate processing elements, or any other processing mechanism or entity in one or more systems, elements, or components. As shown, lock manager 501 is communicatively coupled via communications mechanism 509 with multiple requesters 511-519, which are also communicatively coupled to the mechanism 502 for storing the protected data and/or other resources.

Figure 5B:
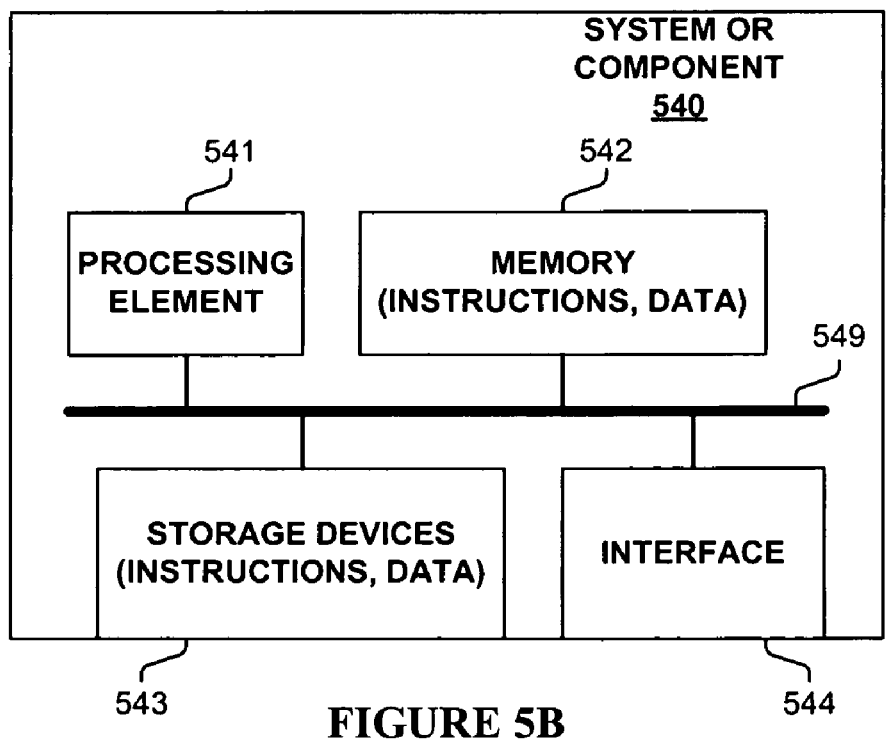
FIG. 5B illustrate a system or component used in one embodiment for implementing a lock manager and/or one or more requesters.

FIG. 5B illustrate a system or component used in one embodiment for implementing a lock manager and/or one or more requesters. In one embodiment, system or component 540 performs one or more processes corresponding to one of the flow diagrams illustrated or otherwise described herein. For example, in one embodiment, the lock manager and requesters are processes running on processing element 541, and memory 542 is used for storing the protected data when it is not communicated via locking messages.

In one embodiment, system or component 540 includes a processing element 541, memory 542, storage devices 543, and an interface 544 for sending and receiving packets, items, and/or other information, which are typically coupled via one or more communications mechanisms 549 (shown as a bus for illustrative purposes.) Various embodiments of component 540 may include more or less elements. The operation of component 540 is typically controlled by processing element 541 using memory 542 and storage devices 543 to perform one or more tasks or processes. Memory 542 is one type of computer-readable media, and typically comprises random access memory (RAM), read only memory (ROM), flash memory, integrated circuits, and/or other memory components. Memory 542 typically stores computer-executable instructions to be executed by processing element 541 and/or data which is manipulated by processing element 541 for implementing functionality in accordance with an embodiment. Storage devices 543 are another type of computer-readable media, and typically comprise solid state storage media, disk drives, diskettes, networked services, tape drives, and other storage devices. Storage devices 543 typically store computer-executable instructions to be executed by processing element 541 and/or data which is manipulated by processing element 541 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for protecting data using locks, the apparatus comprising: one or more processors and memory, configured to include:
   a lock manager configured to control access via a lock to protected data maintained in native storage independent of the lock manager, wherein the lock manager does not access said protected data from said native storage; and
   a plurality of requesters;
   wherein the lock manager is configured to receive lock requests for the lock from each of the plurality of requesters, and to selectively grant said lock requests which includes communicating grants from the lock manager to the plurality of requesters, wherein at least one of said communicated grants includes said protected data received in a corresponding release of the lock message from a previous holder of the lock of the plurality of requestors.

2. The apparatus of claim 1, wherein at least one of said communicated grants does not include said protected data.

3. The apparatus of claim 1, wherein each of said communicated grants includes an indication of whether or not said protected data is being communicated therewith.

4. The apparatus of claim 1, wherein each of said communicated grants includes an indication of whether or not said protected data is requested to be sent to the lock manager with a corresponding release of the lock.

5. The apparatus of claim 1, wherein each of said lock requests includes an indication of whether or not the corresponding one of the plurality of requesters will accept said protected data from the lock manager.

6. A method performed by a lock manager controlling access to protected data maintained in native storage independent of the lock manager, wherein the lock manager does not access said protected data from said native storage, the method comprising:
   receiving a release of a lock for use in controlling access to said protected data, the release including said protected data;
   identifying a next requester to be granted the lock in response to said receiving the release of the lock;
   copying said protected data from the release into a grant message; and
   sending the grant message to the next requester, the grant message including said protected data.

7. The method of claim 6, wherein the grant message includes an indication of that said protected data is requested to be sent to the lock manager in a release message corresponding to the grant message if another requester is waiting for the lock, else an indication that said protected data is not requested to be sent to the lock manager in the release message.

8. A tangible computer-readable medium storing thereon computer-executable instructions for performing steps by a lock manager for controlling access to protected data maintained in native storage independent of the lock manager, wherein the lock manager does not access said protected data from said native storage, said steps comprising:

receiving a release of a lock for use in controlling access to said protected data, the release including said protected data;

identifying a next requester to be granted the lock in response to said receiving the release of the lock;

copying said protected data from the release into a grant message; and sending the grant message to the next requester, the grant message including said protected data.

9. The computer-readable medium of claim 8, wherein the grant message includes an indication of that said protected data is requested to be sent to the lock manager in a release message corresponding to the grant message if another requester is waiting for the lock, else an indication that said protected data is not requested to be sent to the lock manager in the release message.

10. A lock manager controlling access to protected data maintained in native storage independent of the lock manager, wherein the lock manager does not access said protected data from said native storage, the lock manager comprising:

means for receiving a release of a lock for use in controlling access to said protected data, the release including said protected data;

means for identifying a next requester to be granted the lock in response to said receiving the release of the lock;

means for copying said protected data from the release into a grant message and for sending the grant message to the next requester.

11. The lock manager of claim 10, means for including in the grant message an indication of that said protected data is requested to be sent to the lock manager in a release message corresponding to the grant message if another requester is waiting for the lock, else an indication that said protected data is not requested to be sent to the lock manager in the release message.

12. A method performed by a lock manager controlling access to protected data maintained in native storage independent of the lock manager, wherein the lock manager does not access said protected data from said native storage, the method comprising:

receiving locking requests for a lock controlling access to said protected data from a first requester and a second requester;

sending a first grant message to the first requester, the first grant message not including said protected data, and in response to identifying one or more requesters is waiting for the lock after the first requester, including an indication to return said protected data in the first grant message;

receiving a first release message corresponding to the first grant message for the lock from the first requester, the first release message including said protected data and sending a second grant message to the second requestor, the second grant message including said protected data received in the first release message.

13. The method of claim 12, wherein the second grant message includes an indication of whether or not to send said protected data in a second release message.

14. The method of claim 13, wherein the second grant message includes an indication to send said protected data in the second release message in response to identifying another requestor is waiting for access to the lock.

15. The method of claim 13, wherein the second grant message includes an indication not to send said protected data in the second release message in response to identifying another requestor is not waiting for access to the lock.

16. The method of claim 13, wherein the second grant message includes an indication not to send said protected data in the second release message; and the method comprises in response to said indication not to send said protected data in the second release message, the second requester storing said protected data and not including said protected data in the second release message.

17. A tangible computer-readable medium storing thereon computer-executable instructions for performing steps by a lock manager for controlling access to protected data maintained in native storage independent of the lock manager, wherein the lock manager does not access said protected data from said native storage, said steps comprising:

receiving locking requests for a lock controlling access to said protected data from a first requester and a second requester;

sending a first grant message to the first requester, the first grant message not including said protected data, and in response to identifying one or more requesters is waiting for the lock after the first requester, including an indication to return said protected data in the first grant message;

receiving a first release message corresponding to the first grant message for the lock from the first requester, the first release message including said protected data; and sending a second grant message to the second requester, the second grant message including said protected data received in the first release message.

18. The computer-readable medium of claim 17, wherein the second grant message includes an indication of whether or not to send said protected data in a second release message.

19. The computer-readable medium of claim 18, wherein the second grant message includes an indication to send said protected data in the second release message in response to identifying another requestor is waiting for access to the lock.

20. The computer-readable medium of claim 18, wherein the second grant message includes an indication not to send said protected data in the second release message in response to identifying another requestor is not waiting for access to the lock.

21. The computer-readable medium of claim 18, wherein the second grant message includes an indication not to send said protected data in the second release message; and said steps comprise in response to said indication not to send said protected data in the second release message, the second requester storing said protected data and not including said protected data in the second release message.

22. A lock manager controlling access to protected data maintained in native storage independent of the lock manager, wherein the lock manager does not access said protected data from said native storage, the lock manager comprising:

means for receiving locking requests for a lock controlling access to said protected data from a first requester and a second requester;

means for sending a first grant message to the first requester, the first grant message not including said protected data, and in response to identifying one or more requesters is waiting for the lock after the first requester, including an indication to return said protected data in the first grant message;

means for receiving a first release message for the lock from the first requester, the first release message including said protected data; and means for sending a second grant message to the second requester, the second grant message including said protected data received in the first release message.

23. The lock manager of claim 22, wherein the second grant message includes an indication of whether or not to send said protected data in a second release message.

24. The lock manager of claim 23, comprising means for including in the second grant message an indication to send said protected data in the second release message in response to identifying another requestor is waiting for access to the lock.

25. The lock manager of claim 23, comprising means for including in the second grant message an indication not to send said protected data in the second release message in response to identifying another requestor is not waiting for access to the lock.

26. The lock manager of claim 23, comprising: means for including in the second grant message an indication not to send said protected data in the second release message; and means for the second requester to store said protected data and not to include said protected data in the second release message in response to said indication not to send said protected data in the second release message.

* * * * *

UNITED STATES PATENT AND TRADEMARK OFFICE
CERTIFICATE OF CORRECTION

PATENT NO. : 7,627,573 B2  Page 1 of 1
APPLICATION NO. : 10/811044
DATED : December 1, 2009
INVENTOR(S) : Williams, Jr. et al.

It is certified that error appears in the above-identified patent and that said Letters Patent is hereby corrected as shown below:

Face of the Patent, Abstract (57):
    line 14, replace "requestor" with -- requester --
    line 16, replace "requestor" with -- requester --

Col. 2, line 15, replace "requestor" with -- requester --

Col. 3, line 15, replace "requestor" with -- requester --

Col. 3, line 19, replace "requestor" with -- requester --

Col. 6, line 42, replace "requestor" with -- requester --

Col. 6, line 49, replace "requestor" with -- requester --

Col. 7, line 47, replace "requestor" with -- requester --

Col. 12, Claim 1, line 26, replace "requestors" with -- requesters --

Col. 13, Claim 12, line 54, replace "requestor" with -- requester --

Col. 13, Claim 14, line 63, replace "requestor" with -- requester --

Col. 13, Claim 15, line 67, replace "requestor" with -- requester --

Col. 14, Claim 19, line 40, replace "requestor" with -- requester --

Col. 14, Claim 20, line 44, replace "requestor" with -- requester --

Col. 15, Claim 24, line 13, replace "requestor" with -- requester --

Col. 16, Claim 25, line 4, replace "requestor" with -- requester --

Signed and Sealed this

Ninth Day of March, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,627,573 B2 |
| APPLICATION NO. | : 10/811044 |
| DATED | : December 1, 2009 |
| INVENTOR(S) | : Williams et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 955 days.

Signed and Sealed this

Thirty-first Day of May, 2011

David J. Kappos
*Director of the United States Patent and Trademark Office*